Sept. 26, 1961 G. CALIRI 3,002,077
HEATING DEVICE
Filed Dec. 31, 1959 3 Sheets-Sheet 1
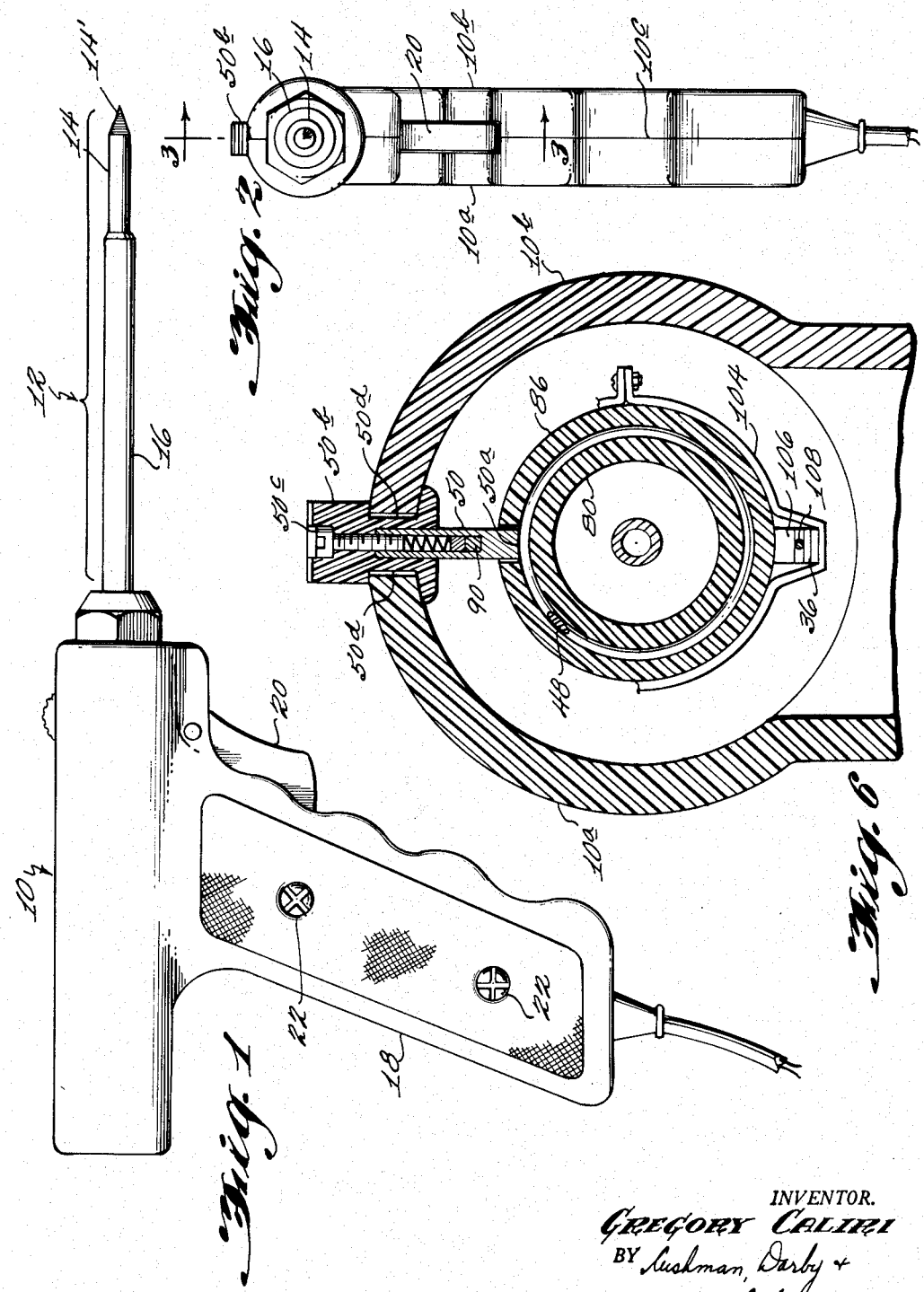
INVENTOR.
GREGORY CALIRI
BY Cushman, Darby &
Cushman
ATTORNEYS

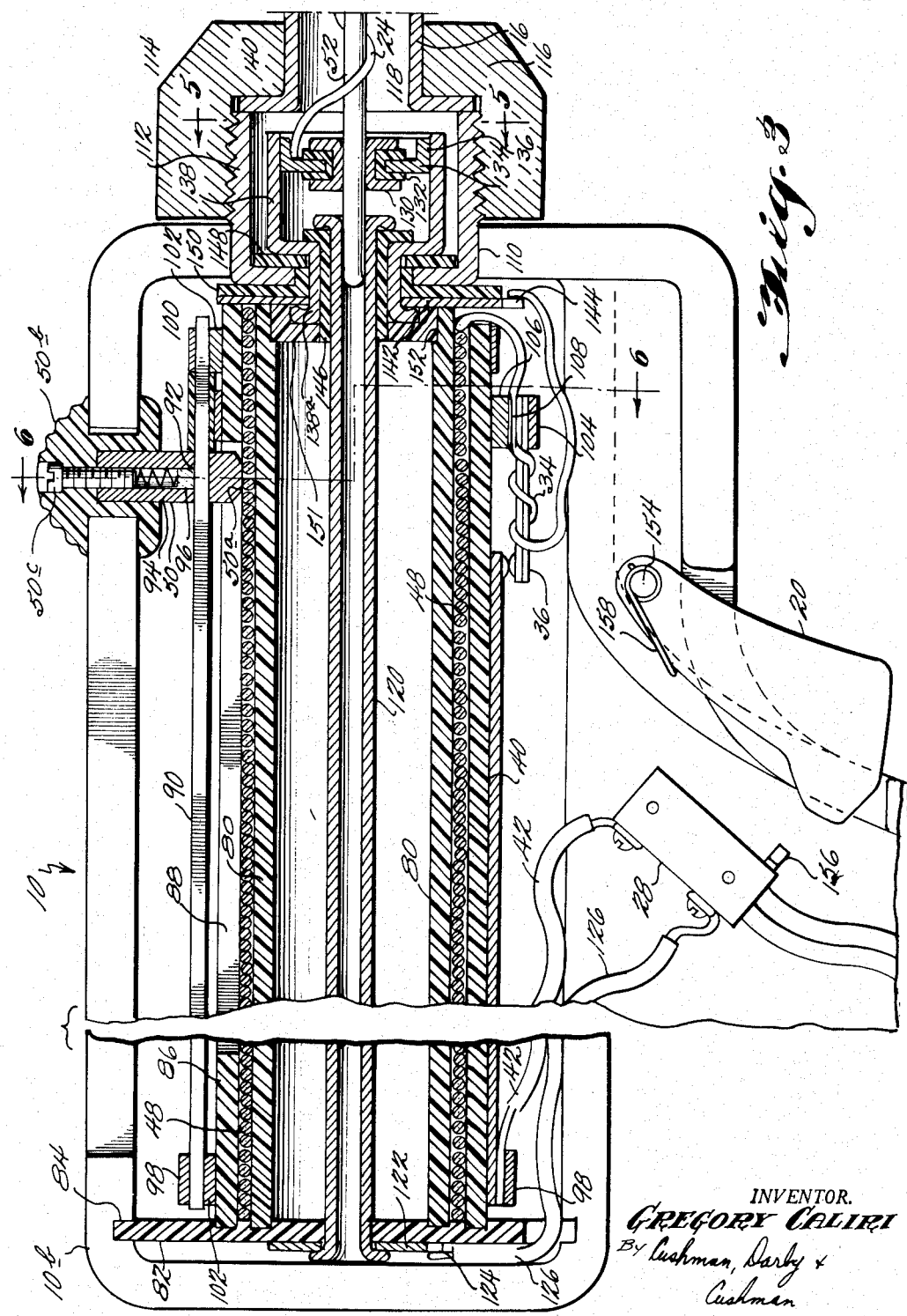

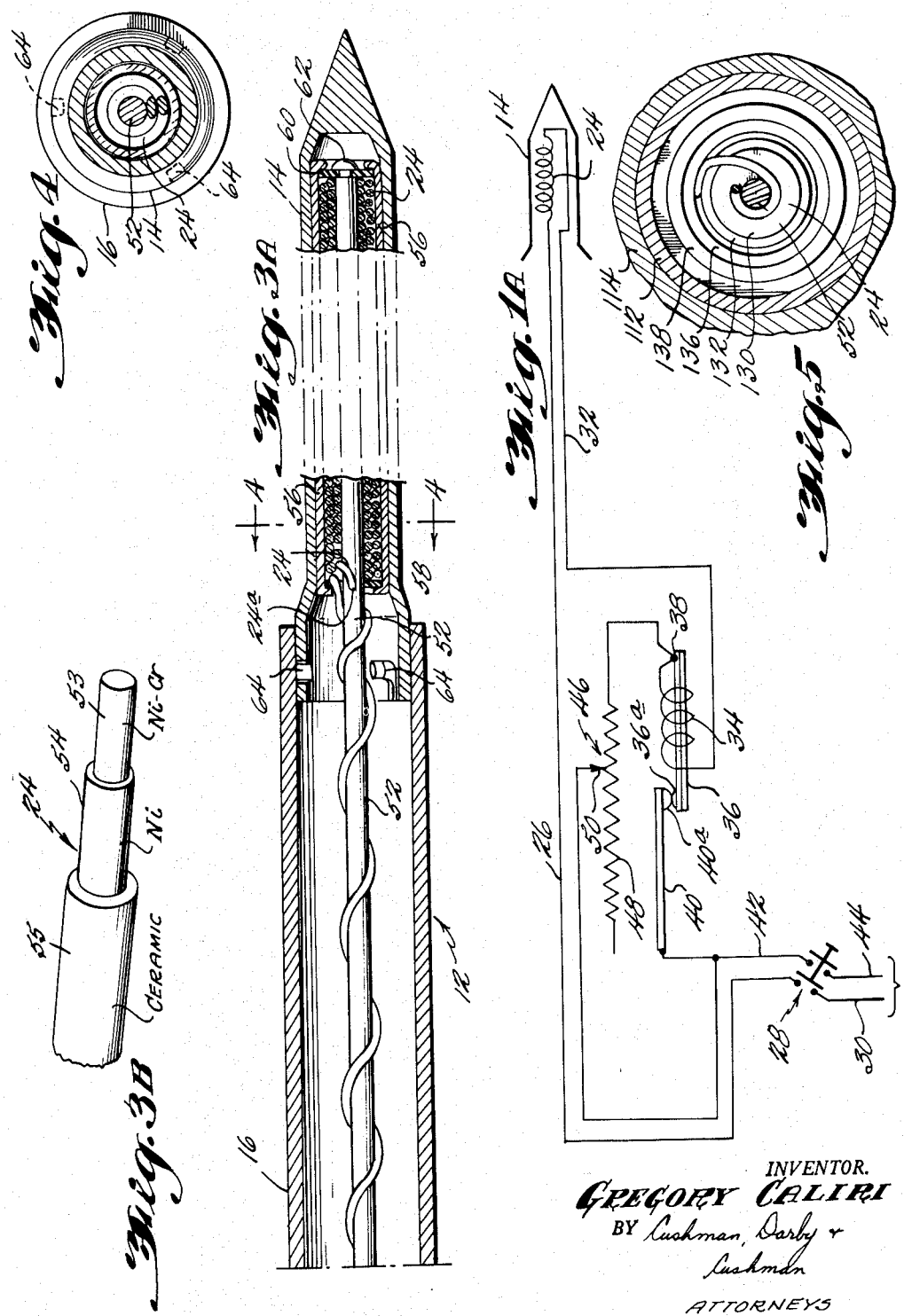

United States Patent Office 3,002,077
Patented Sept. 26, 1961

3,002,077
HEATING DEVICE
Gregory Caliri, % Caliri Inc., 447 Essex St.,
Lawrence, Mass.
Filed Dec. 31, 1959, Ser. No. 863,287
5 Claims. (Cl. 219—26)

This invention pertains to devices for generating concentrated heat in a member which is to be applied to an object to be heated. A typical device of this class, and to which this invention particularly pertains, is a so-called soldering iron or gun.

In the class of device just mentioned, the objective is to raise the temperature of the working tip of the device so that a body of solder or like material may be melted and caused to flow about and adhere to the objects being joined. In many instances the work is very small and/or delicate, say radio parts, and the temperature must be well controlled. Also, maximum heat must be delivered to a small tip of the device, without great loss of heat by flow thereof back along the device toward the handle, away from the tip. It will be understood that the invention applies wherever a source of concentrated heat is needed.

In accordance with the present invention there is provided a type of heating device wherein a maximum amount of heat is delivered to the working tip by a novel heating element, positioned in the tip in the form of multiple-layer winding. Additionally, the heating element is so arranged that working tips may be readily replaced, or, the entire heating section of the device, including the heating element, may be readily replaced.

A still further object of the invention is to provide automatically operating means to cause the working tip to increase rapidly in temperature when the device is first connected to a source of electric current. After reaching working temperature, the temperature may be readily controlled by the operator to suit the device to the temperature requirements of particular work being performed.

Still further objects of the invention will become apparent from the following detailed description of an illustrative embodiment of the invention and from the appended claims. The illustrative embodiment may be best understood with reference to the accompanying drawings, wherein:

FIGURE 1 illustrates a soldering gun in which the invention may be embodied.

FIGURE 1A is an illustrative schematic circuit according to this invention.

FIGURE 2 is a right end view of FIGURE 1.

FIGURE 3 is a detailed longitudinal cross-sectional view of the body portion of FIGURE 1.

FIGURE 3A is a longitudinal cross-sectional view of the heating probe portion of FIGURE 1 as it embodies the invention.

FIGURE 3B shows a broken-away view of a part of an insulated electrical heating element according to this invention.

FIGURE 4 is a cross-sectional view taken along the line 4—4 of FIGURE 3A.

FIGURE 5 is a partial cross-sectional view taken along the line 5—5 of FIGURE 3, and FIGURE 6 is a cross-sectional view of the body portion taken along the line 6—6 of FIGURE 3.

As shown in FIGURE 1 the illustrative embodiment is in the form of a so-called soldering gun, comprising a main body or handle section 10 and a heating probe or arm section 12. The latter is characterized at its extremity by a tip or casing member 14 within which is located an electrical heating resistance element, to be described in detail hereinbelow. As will be well understood, the entire device is used to impart heat at the end 14' of the tip or casing 14, for performing soldering or like operations. Between the tip 14 and the body section 10 the device is characterized by an elongated arm 16, normally desired so that the heating tip 14 may be inserted through structure being worked upon, such as a radio chassis, to reach an inaccessible point with the tip 14.

The body section 10 is characterized by a pistol type hand grip portion 18, and a trigger 20 for connecting and disconnecting the device to a source of electrical current. The body section 10 may be comprised of two one-half sections 10a and 10b (FIG. 2) meeting at the line 10c (FIG. 2), the two parts being held together as by customary screw threaded members 22 (FIG. 1).

The device according to the invention is to be operated by electrical current according to the schematic circuit shown in FIGURE 1A. Here the working tip or casing 14 is indicated, within which appears a heating element 24 connected via conductor 26 through one side of a double pole-single throw switch 28 to a conductor 30 which may be attached to one side of a source of electrical current. The opposite end of the heating element 24 is connected via conductor 32 to an additional heating element 34 wound about a heat responsive switch arm 36, which may be of the typical bi-metallic variety. The end of the additional heating element 34 is electrically connected as at junction 38 to the switch member 36. A cooperating switch member 40 is provided with a contact button 40a placed thereon, to engage a cooperating contact button 36a upon the bi-metallic member 36. The switch member 40 is connected via conductor 42 through the remaining side of the switch 28 to a conductor 44 which may be in turn connected to the remaining side of the source of electrical current. It will be understood that the trigger 20 is to operate the switch 28, in a manner hereinafter described. The electrical circuit further includes an adjustable rheostat 46 connected between the previously mentioned junction 38 and the conductor 42. Rheostat 46 comprises a resistance element 48 and a sliding contact 50.

As will become more fully apparent hereinafter, when trigger 20 is operated to close switch 28, electrical current may flow through a circuit as follows: conductor 30 through switch 28, conductor 26, heating element 24, conductor 32, heating element 34, junction 38, switch member 36, contacts 36a and 40a, switch member 40, conductor 42, switch 28 and to conductor 44. Rheostat 46 is shunted out of the circuit and maximum current will flow through heating element 24. However, heating of switch member 36 also occurs, and shortly the contacts 36a, 40a will separate. Preferably, contacts 36a, 40 will remain separated, the maximum resistance setting of rheostat 46 being selected to be such that sufficient current will flow in the heating element to maintain switch member 36 flexed to open the contacts.

In the manner described, the heating tip 14 will be brought rapidly to operating temperature, whereafter said temperature can be adjusted by movement of the rheostat contact 50.

Referring to FIGURE 3A, the tip or casing 14 is hollow, and within it is the heating element 24, in the form of a multi-turn, multi-layer winding, this being placed about a mandrel 52. One end of the heating element 24 is electrically connected as by welding at 24a to the mandrel, which is electrically conductive. As will become later apparent, mandrel 52 serves as a section of conductor 26 of FIGURE 1A. The other end of heating element 24, an insulated wire member, as explained hereinafter, is enclosed, along with the mandrel, in the supporting arm 16, which may be a tube which joins the tip 14 and associated parts with the body section 10.

Heretofore the art has not enabled the inclusion of enough resistance wire in the working tip or casing of devices of the type being described to provide adequate temperatures. I have discovered how a greatly increased length of heating wire may be in the tip, which is by way of placing a coil of several layers of turns in the tip. I shall hereinafter refer to this as my multi-layer heating winding. Basic to my multi-layer heating winding is a technique of providing upon the heating wire a flexible but heat resistant electrical insulation which I have discovered. Heretofore it has been known that flexible ceramic type coverings can be placed upon electrical conductors. However, the art has not known how to so insulate resistance heating wire. And the art has not appreciated how such wire can be used to advantage in soldering guns and the like.

I have discovered that the electrical resistance heating member, which is preferably a nickel-chromium wire, should be clad with an imperforate tube of substantially pure nickel, and upon the outside of this nickel tube should be placed a flexible ceramic coating in accordance with presently known art. I have discovered that it does not suffice to attempt to place a nickel covering upon the nickel-chromium wire by so-called plating by electrolysis or the like. There are several ways now known to place a flexible ceramic coating upon nickel, and for this phase of the manufacture of my wire the teachings of Patent 2,421,652 may be utilized. The cladding of an outer tube upon an inner member is of course well known in other arts, and the process of itself needs no detailed explanation herein. It will suffice to say that the nickel tube should be slipped over the heating wire, and then subjected to a drawing operation which will forcibly reduce the inner diameter of the tube to snugly fit the wire. Thereafter, the flexible ceramic sheath may be placed upon the clad tube.

FIGURE 3B illustrates an inner heating member 53, say nickel-chromium wire, with a cladded tube 54 of nickel surrounding it, and flexible ceramic 55 upon said tube.

Preferably a sheath 56 surrounds the heating winding 24. If this is an electrically conductive member, as it usually will be, it may be insulated from the mandrel by ceramic disks 58 and 60. The assembled winding, sheath and disks may be retained on the mandrel by riveting-over a reduced-diameter end of the mandrel, as shown at 62 in FIGURE 3A.

It is usually desirable to have tips of different exterior contour. Therefore, a bayonet type connection may be provided between the tip 14 and supporting tube 16, as shown by use of bayonet pins 64 in FIGURE 3A.

Turning now to the body section 10 of the device, there is shown in FIGURE 3 a view with the casing portion 10a removed, and the contents otherwise generally shown in cross section. Body section 10 contains the rheostat 48, the temperature responsive switch comprising members 36 and 40, the additional heating element 34 which heats the switch member 36, the switch 28, and the trigger 20 to operate the switch. These parts are identified in FIGURE 3 with the reference characters previously employed.

The rheostat winding 48 is of insulated wire wound upon a tube 80 which seats at the left-hand end (as viewed in FIGURE 3) in a board 82 which otherwise fits into channels 84 in the respective sections 10a and 10b of the body section of the device. At the right-hand end of tube 80 as viewed in FIGURE 3, tube 80 nests in structure to be described hereinafter which also is part of the mechanical and electrical joint to the heating probe section 12 of the device.

Immediately to the outside of the rheostat winding 48 is a further tube 86, this being provided along its top with a cut-away portion or slit 88 which permits the passage of the rheostat sliding contact 50, which engages the convolutions of the rheostat winding 48 as at 50a. The convolutions of winding 48 are bared at the top points thereof to contact with 50a. The sliding contact 50 is further provided with an insulated button 50b which extends outside the body section through of cut-away portions constituting a slit along the top of the body section when assembled. See also FIGURE 6. The contact member 50 may be joined to the insulated operator button 50b by use of a threaded screw 50c. Screw member 50c may be made of nylon or like material and thus the operator faces no hazard of making electrical connection between his finger and the contact member 50.

The sliding contact assembly 50 may be retained in position with respect to the casing, by having the insulated operating button 50b provided with channels 50d (FIGURE 6) to cooperate with the edges of the cut-away portions of body section member 10a and 10b.

To provide sliding electrical contact between the contact member 50 and the conductor 42, a bar 90 is fixedly positioned upon the exterior of the tube 86, and this bar slides through an aperture 92 in contact member 50, thereby providing said sliding contact. Preferably, the screw threaded member 50c also serves to compress a spring 94 within the contact member 50, for causing downward pressure upon a brush 96 which engages rod 90, to insure a good electrical contact at all times.

The bar 90, the switch member 40 and the conductor 42 leading to switch 28 are electrically joined by a band 98 (see also FIG. 6) which surrounds tube 86 and thereby clamps the bar 98 above the top of tube 86, and clamps the switch member 40 and the bared end of conductor 42 at the bottom of the left-hand end of tube 86.

At its right-hand end as viewed in FIGURE 3, the bar 90 may be similarly supported on tube 86 by a band 100. Beneath the bands 98 and 100 there may be provided suitable blocks 102 to elevate the bar 90 a short distance above the outer surface of tube 86. To insure good contact between contact member 50 as at 50a, and the convolutions of rheostat 48, the bar 90 may be given an initial downward bend, although this does not appear in the final assembly because the contact member 50 holds the bar substantially straight, as shown.

The switch member 36 is mounted upon the bottom of tube 86 by use of a further band 104. If desired a block 106 may be placed under the switch member 36 to separate same an adequate distance from the bottom of tube 86. An electrical connection to create the junction 38 (FIG. 1A) may be created by electrically joining the ends of rheostat winding 48 and additional heating element 34, as at 108 between the band 104 and the block 106.

The additional heating element 34 may be of the same construction as the main heating element 24; that is, characterized by an electrical heating wire having clad thereon a tube of substantially pure nickel and the latter encased in a flexible ceramic coating. Only a limited amount of heating element should be used at the switch member 36 to avoid undesirable and unnecessary heating of the body section.

For detachably fixing the heating probe section 12 of the device to the body section 10, the body portions 10a and 10b have semi-circular portions cut away, so as to provide, when assembled, a circular opening 110 in the right-hand end of the assembly body section as shown in FIGURE 3. In this circular opening is positioned a threaded bushing 112, upon which a nut 114 may be affixed. Nut 114 is provided with an inwardly extending shoulder portion 116, which serves to capture and clamp an outwardly turned shoulder 118 of the tube 16 to the right-hand end of the bushing 112. Thusly, the tube 16 may be detachably secured to the body section of the device.

To make an electrical connection to serve the purpose of the conductor 26 of FIGURE 1A, the mandrel 52, to which one end of the heating element 24 is connected (FIG. 1A), protrudes from the end of the tube 16, and is slidably inserted into the right-hand end (FIG. 3)

of a central tube 120 of electrically conductive material. Tube 120 extends through the supporting board (of insulating material) 82 and engages a washer 122 which is further attached at 124 to a length of conductor 126 which leads to the switch 28.

According to FIGURE 1A the opposite end of heating element 24 is electrically joined to the end of additional heating element 34 opposite to the end thereof connected to junction 38 (joint 108 in FIG. 3). This connection is provided as follows: an annular channel member 130 is fixed as by welding to mandrel 52 just short of its entry into the tube 120. An electrically insulating annular channel 132 is provided within channel 130, and within channel 132 is a conductive washer 134 with a shoulder portion 136 arranged for sliding engagement with a surrounding tubular member 138. The latter may be slit lengthwise as at several points about its circumference (not shown) to give the intervening sections an opportunity to spread slightly when engaged by the member 134. The bared end of conductor 24 may be electrically connected as at 140 to the member 134. It should not be apparent that when the heating probe section 12 of the device is slidably inserted into the just mentioned structure, the mandrel 52 makes electrical engagement in the tube 120, and the member 134 makes electrical engagement with member 138.

An extended portion 138a of member 138 makes electrical connection to a conductive washer 142 to which the end of additional heating element 34 is connected as at joint 144. Conductive member 142 is electrically isolated from tube 120 and from bushing 112 by use of an insulating sleeve 146 about the tube 120, an insulating washer 148 between members 112 and 138, and a further insulating washer 150 between washer 142 and the left-hand extremity of member 112. In this way the necessary circuit connections are completed between elements 24 and 34.

The right-hand end of tube 80 is held in position relative to tube 120 and the other parts, by use of an annular member 151 surrounding insulating sleeve 146 and seated in an enlarged inside diameter section 152 of tube 80. Riveting of tube 120 beyond washer 122 at the left end and sleeve 146 at the right end retains the assembly together, as can be readily appreciated from the drawing.

Movement of trigger 20 about its pivot 154 will operate switch 28 by engagement with its button 156, spring 158 returns the trigger. It will now be apparent that in accordance with the present invention there is provided a device for producing concentrated heat at the operating tip, the temperature of which is automatically raised rapidly by excess current, until a general operating range is reached. Thereafter, the amount of heating current, and therefore the temperature of the tip, is conveniently controlled from the body or handle of the device. The amount of heat concentrated in the tip is much greater than heretofore available, due to the novel type of heating element and its multi-layer winding within the tip. Additionally, in accordance with the illustrative embodiment, tips may be readily interchanged with the heating winding in place. Or, the entire heating probe section, including the heating winding may be readily removed from the body section of the device. It is to be understood that the illustrative embodiment of the invention which has been described in detail is not intended to limit the scope of the invention, but the scope of the invention is to be determined from the appended claims.

What is claimed is:

1. An elongated, insulated electrical heating element comprising an inner heating member having predetermined electrical resistance characteristics, an imperforate tube of substantially pure nickel clad upon said inner member to encase same throughout its length, and a coating of flexible ceramic material surrounding said tube throughout its length.

2. A leading element as in claim 1 wherein the core member is a nickel-chromium alloy.

3. A heating device including a hollow casing of heat conductive material, and within said casing a multi-layer winding formed from an elongated insulated electrical heating element comprising an inner heating member having predetermined electrical resistance characteristics, an imperforate tube of substantially pure nickel clad upon said inner member to encase same throughout its length, and a coating of flexible ceramic material surrounding said tube throughout its length.

4. A heating device comprising an elongated hollow casing of heat conductive material, a mandrel running longitudinally of said casing and positioned centrally therein and a multi-layer winding within said casing and about said mandrel, the winding formed from an elongated, insulated electrical heating element comprising an inner heating member having predetermined electrical resistance characteristics an imperforate tube of substantially pure nickel clad upon said inner member to encase same throughout its length, and a coating of flexible ceramic material surrounding said tube throughout its length.

5. A device as in claim 4 and further including a sheath of heat conductive material surrounding said winding and fitting within said casing.

References Cited in the file of this patent

UNITED STATES PATENTS

| | | |
|---|---|---|
| 915,974 | Leonard | Mar. 23, 1909 |
| 1,292,402 | Christian | Jan. 21, 1919 |
| 1,436,957 | Harvey | Nov. 28, 1922 |
| 1,671,344 | Chapman | May 29, 1928 |
| 2,104,045 | Knopp | Jan. 4, 1938 |
| 2,195,638 | Anderson | Apr. 2, 1940 |
| 2,535,268 | Coats | Dec. 26, 1950 |
| 2,619,576 | Griebach | Nov. 2, 1952 |
| 2,908,793 | Aloi | Oct. 13, 1959 |